(12) United States Patent
Fein et al.

(10) Patent No.: US 8,893,232 B2
(45) Date of Patent: Nov. 18, 2014

(54) MEDIA MONITORING SYSTEM

(75) Inventors: Gene S. Fein, Malibu, CA (US);
Edward A. Merritt, Lenox, MA (US)

(73) Assignee: Empire Technology Development LLC, Wilmington, DE (US)

( * ) Notice: Subject to any disclaimer, the term of this patent is extended or adjusted under 35 U.S.C. 154(b) by 1428 days.

(21) Appl. No.: 12/367,237

(22) Filed: Feb. 6, 2009

(65) Prior Publication Data

US 2010/0205656 A1    Aug. 12, 2010

(51) Int. Cl.
*H04L 29/06* (2006.01)
*G06F 21/10* (2013.01)

(52) U.S. Cl.
CPC ........ *G06F 21/10* (2013.01); *G06F 2221/2101* (2013.01); *G06F 2221/2115* (2013.01)
USPC .................... 726/3; 726/8; 386/261

(58) Field of Classification Search
USPC ........................ 726/3, 28; 386/261
See application file for complete search history.

(56) References Cited

U.S. PATENT DOCUMENTS

| | | | |
|---|---|---|---|
| 6,430,360 B1 * | 8/2002 | Oh et al. ........................ | 386/261 |
| 6,526,070 B1 | 2/2003 | Bernath et al. | |
| 7,028,306 B2 | 4/2006 | Boloker et al. | |
| 7,437,772 B1 * | 10/2008 | Thenthiruperai et al. ...... | 726/30 |
| 7,533,061 B1 | 5/2009 | Cheng et al. | |
| 7,653,761 B2 | 1/2010 | Juster et al. | |
| 7,756,753 B1 | 7/2010 | McFarland | |
| 7,869,792 B1 * | 1/2011 | Zhou et al. .................... | 455/411 |
| 7,949,713 B2 | 5/2011 | Naito et al. | |
| 8,079,044 B1 * | 12/2011 | Craner ........................... | 725/28 |
| 2002/0099860 A1 | 7/2002 | Miller et al. | |
| 2002/0120675 A1 | 8/2002 | Everett et al. | |
| 2004/0024580 A1 | 2/2004 | Salmonsen et al. | |
| 2004/0190046 A1 | 9/2004 | Ilda | |
| 2005/0021637 A1 * | 1/2005 | Cox .............................. | 709/206 |
| 2005/0239401 A1 | 10/2005 | Nam | |
| 2005/0256923 A1 | 11/2005 | Adachi | |
| 2006/0126452 A1 | 6/2006 | Yamashita et al. | |
| 2006/0149727 A1 * | 7/2006 | Viitaharju ......................... | 707/5 |
| 2006/0190402 A1 * | 8/2006 | Patron et al. .................... | 705/51 |

(Continued)

FOREIGN PATENT DOCUMENTS

| | | |
|---|---|---|
| JP | H1021165 A | 1/1998 |
| JP | 2002108838 A | 4/2002 |

(Continued)

OTHER PUBLICATIONS

Net Nanny, ContentWatch, Inc., 2001-2012, www.netnanny.com.

(Continued)

*Primary Examiner* — Michael Pyzocha
(74) *Attorney, Agent, or Firm* — Moritt Hock & Hamroff LLP; Steven S. Rubin, Esq.

(57) ABSTRACT

A media monitoring system that allows a monitoring device to control the media content that can be downloaded by a monitored device. The monitoring device reviews requests for media content from the monitored device and makes a decision whether to allow the monitored device access to the media content. Authorization may occur interactively or automatically using media settings associated with the monitored device. The monitored device is prevented from accessing media content until the media content is authorized. The media monitoring system may operate in a wired and/or wireless network.

23 Claims, 7 Drawing Sheets

(56) References Cited

U.S. PATENT DOCUMENTS

| | | |
|---|---|---|
| 2006/0190559 A1 | 8/2006 | Lim |
| 2006/0242309 A1* | 10/2006 | Damick et al. ............... 709/229 |
| 2007/0142039 A1* | 6/2007 | Bushnell et al. ........... 455/414.1 |
| 2007/0150444 A1 | 6/2007 | Chesnais et al. |
| 2007/0150918 A1* | 6/2007 | Carpenter et al. .............. 725/25 |
| 2007/0180100 A1* | 8/2007 | Biggs et al. .................. 709/224 |
| 2007/0239899 A1 | 10/2007 | Gonen et al. |
| 2007/0260603 A1* | 11/2007 | Tuscano et al. ................... 707/9 |
| 2008/0005325 A1* | 1/2008 | Wynn et al. .................... 709/225 |
| 2008/0145025 A1* | 6/2008 | Wimberly et al. ............. 386/95 |
| 2008/0184284 A1* | 7/2008 | O'Hern ........................... 725/28 |
| 2008/0248779 A1* | 10/2008 | Tsui et al. ..................... 455/408 |
| 2008/0257134 A1 | 10/2008 | Oppenheimer |
| 2009/0055377 A1 | 2/2009 | Hedge et al. |
| 2009/0056525 A1 | 3/2009 | Oppenheimber |
| 2009/0217342 A1* | 8/2009 | Nadler .............................. 726/1 |
| 2010/0015956 A1* | 1/2010 | Qu et al. ..................... 455/414.1 |
| 2010/0057583 A1* | 3/2010 | Jeffs et al. ........................ 705/26 |
| 2010/0115592 A1* | 5/2010 | Belz et al. ......................... 726/5 |
| 2010/0154021 A1 | 6/2010 | Howarter et al. |

FOREIGN PATENT DOCUMENTS

| | | |
|---|---|---|
| JP | 2004288025 A | 10/2004 |
| JP | 2005071381 A | 3/2005 |
| JP | 2005339523 A | 12/2005 |
| JP | 2006074405 A | 3/2006 |
| JP | 2006146980 A | 6/2006 |
| JP | 2006268654 A | 10/2006 |
| JP | 2007233515 A | 9/2007 |
| JP | 2008502176 A | 1/2008 |
| KR | 1020060092317 A | 8/2006 |
| KR | 1020070040592 A | 4/2007 |
| WO | 2007011329 A1 | 1/2007 |
| WO | 2007016463 A2 | 2/2007 |
| WO | 2007044590 A2 | 4/2007 |
| WO | 2007106260 A2 | 9/2007 |
| WO | 2008054505 A2 | 5/2008 |

OTHER PUBLICATIONS

K9 Web Protection from Blue Coat: What do you want to protect?, Blue Coat Systems, 2010, www.k9webprotection.com.

"Cloud computing," Wikipedia, accessed at http://web.archive.org/web/20090107214626/http://en.wikipedia.org/wiki/Cloud_Computing, last modified on Jan. 7, 2009, pp. 1-7.

"MoodLogic," Wikipedia, accessed at http://web.archive.org/web/20080117021240/http://en.wikipedia.org/wiki/MoodLogic, last modified Nov. 17, 2007, pp. 1-1.

* cited by examiner

600 A COMPUTER PROGRAM PRODUCT

602 COMPUTER STORAGE MEDIA HAVING AT LEAST TWO COMPUTER-EXECUTABLE INSTRUCTIONS INCLUDING

610 RECEIVING AN AUTHORIZATION REQUEST THAT ORIGINATED FORM AN ASSOCIATED DEVICE

612 OBTAINING A MEDIA SELECTION FROM THE AUTHORIZATION REQUEST

614 MAKING A DECISION WHETHER TO ALLOW THE ASSOCIATED DEVICE ACCESS TO THE MEDIA SELECTION

616 SENDING THE DECISION TO THE ASSOCIATED DEVICE

604 A RECORDABLE MEDIUM

606 A COMPUTER-IMPLEMENTED METHOD

*Fig. 6*

700 A COMPUTER PROGRAM PRODUCT

702 COMPUTER STORAGE MEDIA HAVING AT LEAST TWO COMPUTER-EXECUTABLE INSTRUCTIONS INCLUDING

710 SENDING AN AUTHORIZATION REQUEST TO AN ASSOCIATED DEVICE, THE AUTHORIZATION REQUEST INCLUDING A MEDIA SELECTION

712 RECEIVING AN AUTHORIZATION RESPONSE FROM THE ASSOCIATED DEVICE, THE AUTHORIZATION RESPONSE INCLUDING A DECISION ON WHETHER THE MEDIA SELECTION CAN BE DOWNLOADED

714 ACTING IN ACCORDANCE WITH THE DECISION WITH RESPECT TO THE MEDIA SELECTION

704 A RECORDABLE MEDIUM

706 A COMPUTER-IMPLEMENTED METHOD

*Fig. 7*

MEDIA MONITORING SYSTEM

BACKGROUND

Today, many children have their own cellular phones, music players, and other electronic devices. Several of the electronic devices allow a user (e.g., the child) to download content (e.g., music, video) to the electronic device. This creates a problem for parents who may not want certain content downloaded by their children.

BRIEF DESCRIPTION OF THE DRAWINGS

The features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings in which:

FIG. 6 is a diagram generally illustrating a computer product configured to perform processing by the monitored device in the media monitoring system shown in FIG. 1; and FIG. 7 is a diagram generally illustrating a computer product configured to perform processing by the monitoring device in the media monitoring system shown in FIG. 1.

Figure 1:
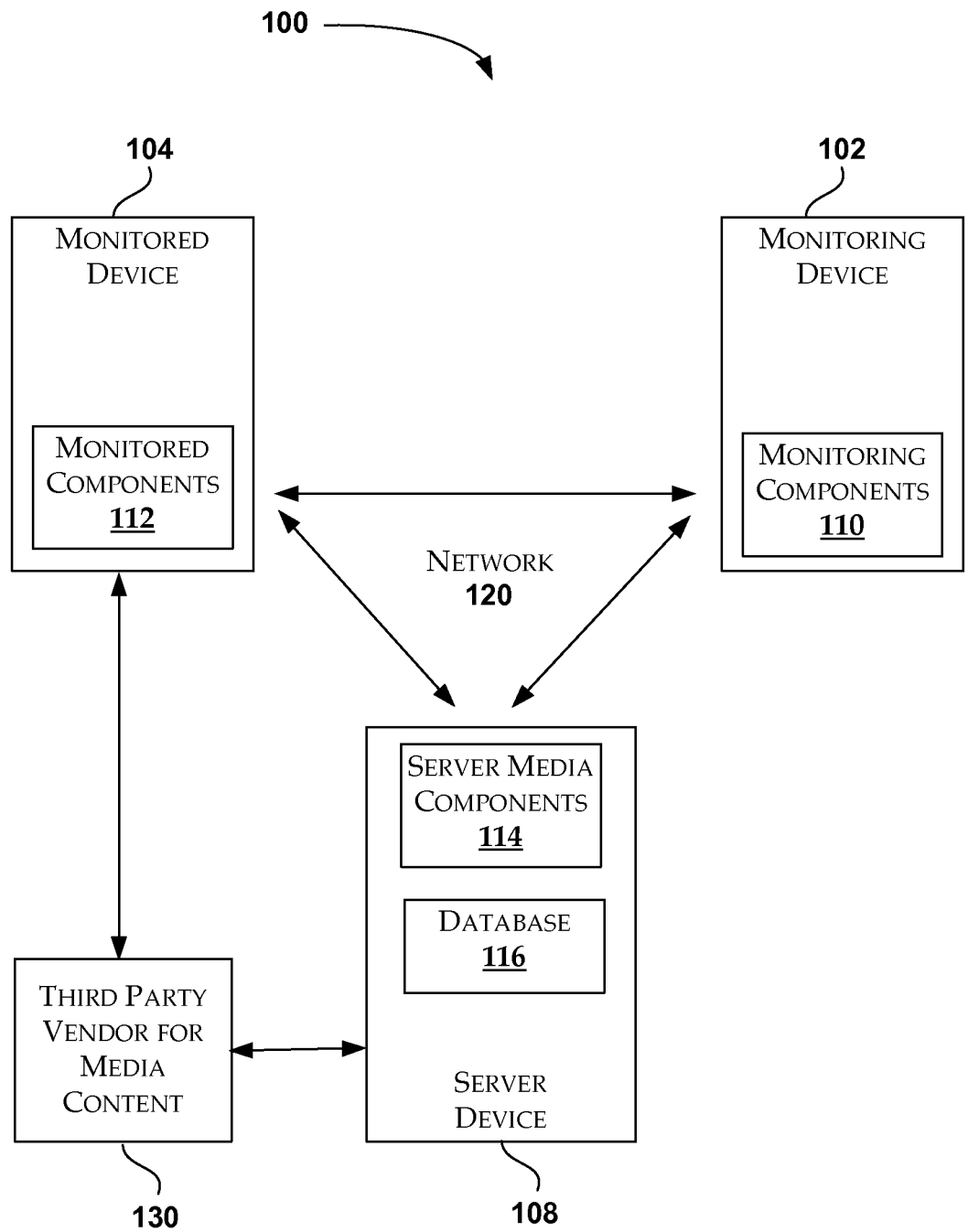
FIG. 1 is a functional block diagram generally illustrating a media monitoring system.

Embodiments of the present media monitoring system and technique will now be described in detail with reference to these Figures.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and made part of this disclosure.

This disclosure is drawn, inter alia, to methods, apparatus, computer programs and systems related to a media monitoring system. In overview, the media monitoring system is configured so that one electronic device (e.g., a parent's device) is able to monitor media selections requested by another electronic device (e.g., a child's device) and to authorize whether or not the other electronic device can download the requested media content onto the other electronic device. The monitoring and authorization may be performed using pre-determined default settings, by real-time interactions, or by any combination of default settings and real-time interactions.

FIG. 1 is a functional block diagram that generally illustrates a media monitoring system. The media monitoring system 100 includes a monitoring device 102, a monitored device 104, and one or more media monitoring components (e.g., monitored components 112, monitoring components 110, and/or server media components 114). While FIG. 1 illustrates a one-to-one correspondence between a monitoring device and a monitored device, one skilled in the art will appreciate that one monitoring device 102 may monitor multiple devices 104. Likewise, multiple monitoring devices 102 (e.g., a father's monitoring device and a mother's monitoring device) may monitor one monitored device 104 (e.g., child's device). A monitoring device and a monitored device that communicate in accordance with the present disclosure are both considered "associated devices". The media monitoring components perform monitoring and authorization functionality between the monitoring device 102 and the monitored device 104. The media monitoring components may reside in various configurations on the monitoring device 102, on the monitored device 104, and/or on one or more server devices 108.

FIG. 1 illustrates one example arrangement for the media monitoring components where a first portion (e.g., monitoring components 110) resides on the monitoring device, a second portion (e.g., monitored components 112) resides on the monitored device, and a third portion (e.g., server media components 114) resides on the server device 108. In this embodiment, the server device 108 may be configured to handle interactions between multiple monitoring devices and monitored devices. The server device 108 may be configured with a database 116 using conventional techniques and may be configured with third party components (not shown) that provide access to the requested media content from one or more third party vendors of media content. In another arrangement, the media monitoring components may reside on only the monitoring device and the monitored device. The requested media content includes, but is not limited to, audio-visual content, text, images, audio, voice messages, or any other downloadable or streamed media content.

Figure 2:
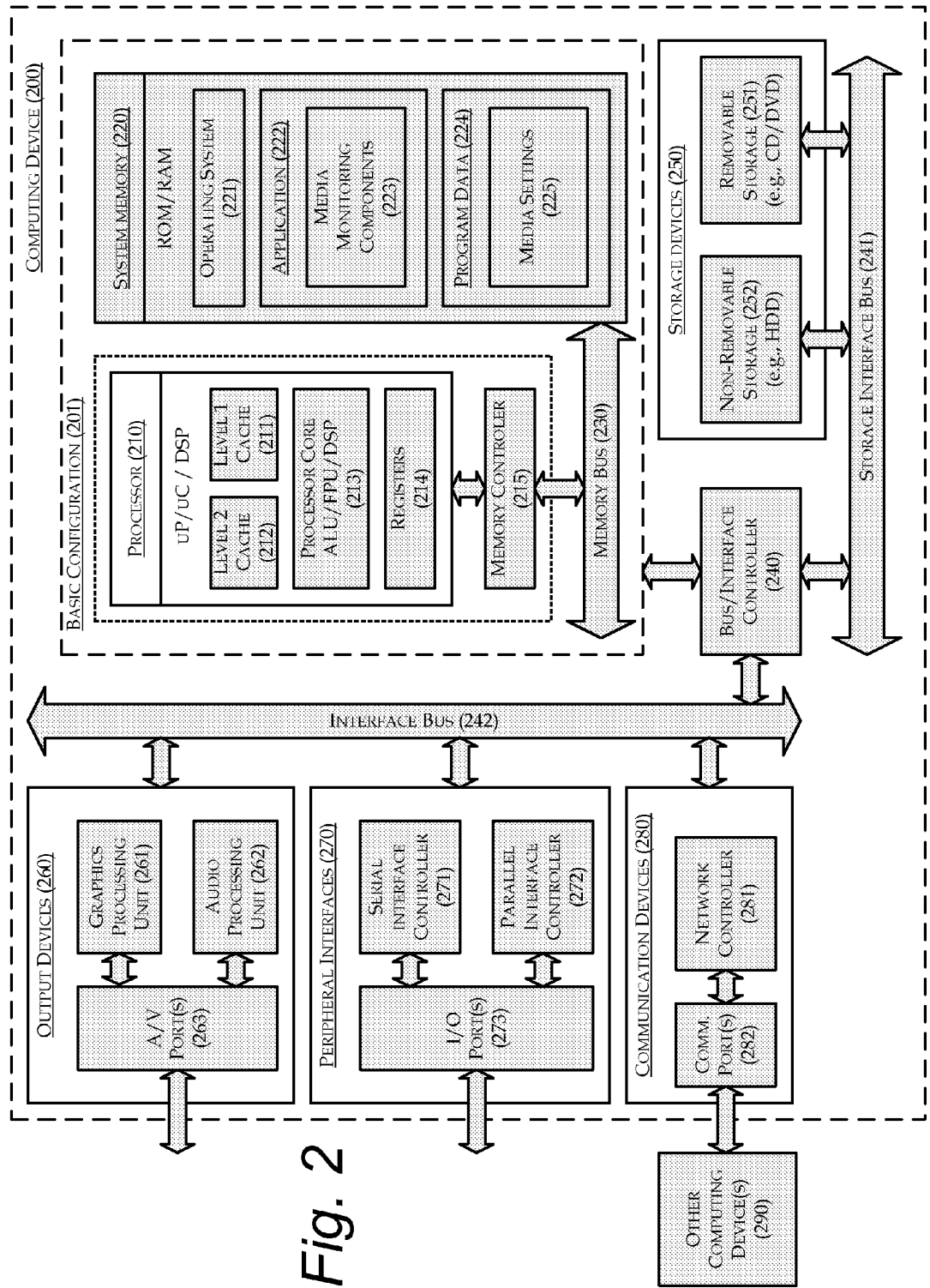
FIG. 2 is functional block diagram of an example computing device that may be configured for implementing a portion of the media monitoring components for the media monitoring system shown in FIG. 1 in accordance with the present disclosure.

The monitored device may be any type of device that allows media content to be downloaded onto the device. For example, the monitored device may be a cellular phone, a media player, and the like that are capable of downloading media content from the third party vendor 130, but in accordance with the present disclosure will not be able to access the media content until authorization is received for the media content. The monitoring device may be any type of device that is configured to respond to media requests from the monitored device. Monitored device and monitoring device may be similar types of devices or they may be different types of devices. FIG. 2 illustrates basic components of a computing device that may be used as a monitoring device 102, monitored device 104, or the optional server device 108.

Communication network 120 used by the media monitoring system 100 can be of any type including but not limited to wireless network, a cellular network, a wired network, or any combination thereof. These communication networks are well known to those skilled in the art and need not be further described.

FIG. 2 is a functional block diagram of an example computing device 200 that may be configured for implementing a portion of the media monitoring components for the media monitoring system shown in FIG. 1 in accordance with the present disclosure. The monitoring device and the monitored device may use the same basic configuration, shown as basic configuration 201 with modifications to the media monitoring components 223 that are used by the respective device. In basic configuration 201, computing device 200 typically includes one or more processors 210 and system memory 220. A memory bus 230 can be used for communicating between the processor 210 and the system memory 220.

Depending on the desired configuration, processor 210 can be of any type including but not limited to a microprocessor (µP), a microcontroller (µC), a digital signal processor (DSP), or any combination thereof. Processor 210 can include one more levels of caching, such as a level one cache 211 and a level two cache 212, a processor core 213, and registers 214. The processor core 213 can include an arithmetic logic unit (ALU), a floating point unit (FPU), a digital signal processing core (DSP Core), or any combination thereof. A memory controller 215 can also be used with the processor 210, or in some implementations the memory controller 215 can be an internal part of the processor 210.

Depending on the desired configuration, the system memory 220 can be of any type including but not limited to volatile memory (such as RAM), non-volatile memory (such as ROM, flash memory, etc.) or any combination thereof. System memory 220 typically includes an operating system 221, one or more applications 222, and program data 224. Application 222 includes one or more media monitoring components 223 that are arranged to allow requested media to be monitored. For example, when computing device 200 is configured as a monitored device, application 222 may include monitored components 112 that intercept download requests for media and transmit an authorization request to the monitoring device. In another example, when computing device is configured as a monitoring device, application 222 may include monitoring components 110 that receive the authorization request and determine whether to allow the media to be downloaded or not. In still another example, when computing device is configured as a server device, application 222 may include server media components 114 that manage multiple interactions between monitoring devices and associated monitored devices. Details of the media monitoring components for these various configurations of the present disclosure are described in more detail in conjunction with FIGS. 3 and 4. Program Data 224 includes media settings 225 that may be used to associate a monitored device with a corresponding monitoring device and to provide automatic authorization responses, as will be further described below. This described basic configuration is illustrated in FIG. 2 by those components within dashed line 201.

Computing device 200 can have additional features or functionality, and additional interfaces to facilitate communications between the basic configuration 201 and any required devices and interfaces. For example, a bus/interface controller 240 can be used to facilitate communications between the basic configuration 201 and one or more data storage devices 250 via a storage interface bus 241. The data storage devices 250 can be removable storage devices 251, non-removable storage devices 252, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 220, removable storage 251, and non-removable storage 252 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 200. Any such computer storage media can be part of device 200.

Computing device 200 can also include an interface bus 242 for facilitating communication from various interface devices (e.g., output interfaces, peripheral interfaces, and communication interfaces) to the basic configuration 201 via the bus/interface controller 240. Example output devices 260 include a graphics processing unit 261 and an audio processing unit 262, which can be configured to communicate to various external devices such as a display or speakers via one or more A/V port 263. Example peripheral interfaces 270 include a serial interface controller 271 or a parallel interface controller 272, which can be configured to communicate with external devices such as input devices (e.g., keyboard, mouse, pen, voice input device, touch input device, etc.) or other peripheral devices (e.g., printer, scanner, etc.) via one or more I/O ports 273. An example communication device 280 includes a network controller 281, which can be arranged to facilitate communications with one or more other computing devices 290 over a network communication via one or more communication ports 282. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 200 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 200 can also be implemented as a personal computer including both laptop computer and non-laptop computer configurations.

Figure 3:
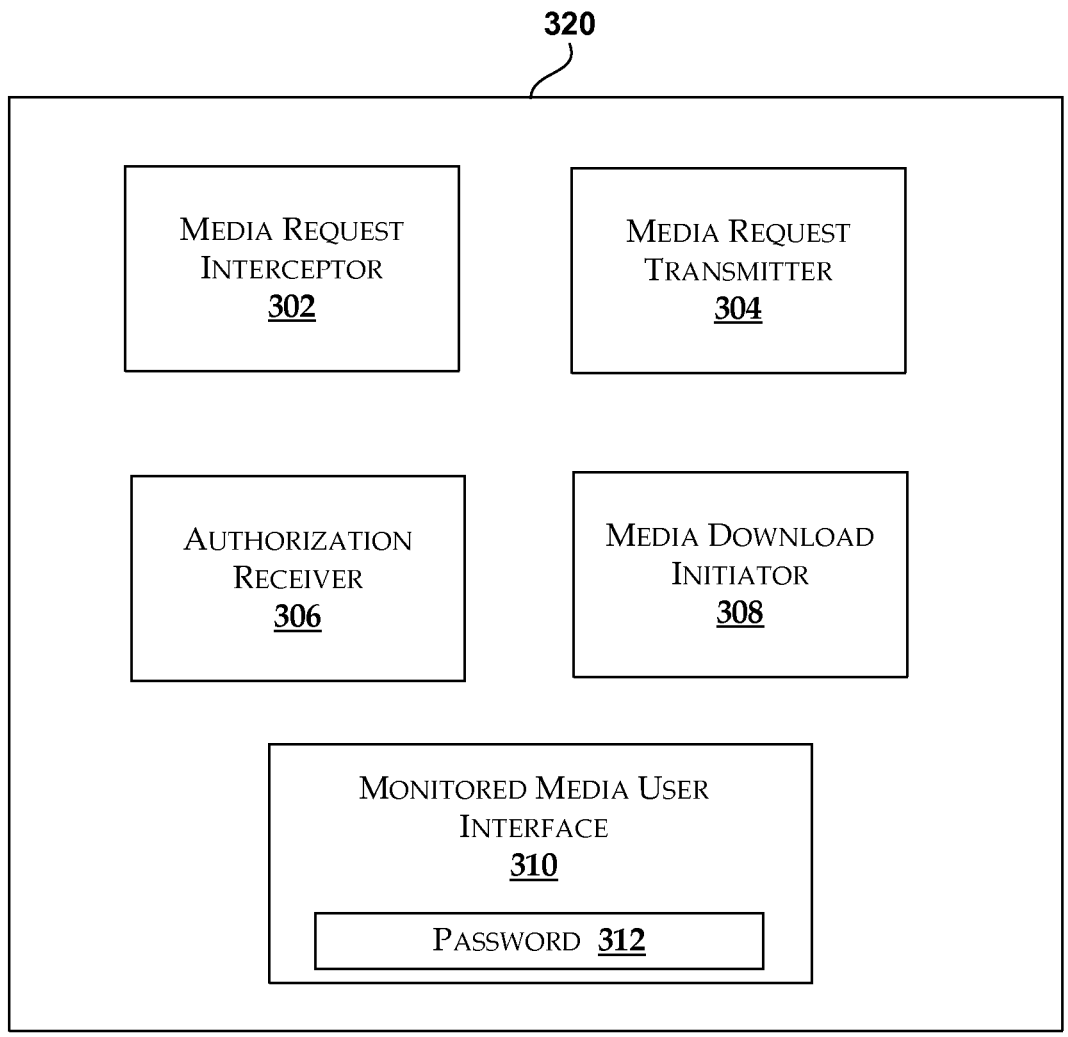
FIG. 3 is a block diagram of illustrative monitored components that implement functionality used by the monitored device in the media monitoring system shown in FIG. 1.

FIG. 3 is a block diagram of illustrative monitored components that implement functionality used by the monitored device 104 in the media monitoring system 100 shown in FIG. 1. The monitored components used by the monitored device include a media request interceptor 302, a media request transmitter 304, an authorization receiver 306, a media download initiator 308, and a monitored media user interface 310. These components may be grouped together into a monitored media controller 320 that can be installed on a computing device to configure the computing device as a monitored device.

In overview, the monitored device is unable to access media until a monitoring device has authorized access to the media. As those skilled in the art recognize in light of the present disclosure, the functionality provided by one or more of the different sub-components may be provided by one or more of the other sub-components without departing from the scope of the present disclosure. The break up of the program modules into smaller sub-components is merely to aid in the description of the functionality for the monitored device. The functionality provided by each of the sub-components is described below.

The media request interceptor 302 recognizes download requests for media and intercepts the request to identify the requested media. The download requests may be initiated by the user of the monitored device to acquire certain media content, may be initiated in response to a text message that contains certain media content, or the like. In some embodiments, the media request interceptor 302 may be a program that is called by the program requesting the media download. In some other embodiments, the media request interceptor 306 may be an interrupt routine that is triggered when the monitored device performs a certain action, such as initiating communication with a third party media vendor to download media content. In still some other embodiments, the media request interceptor 302 may listen for communications with a third party media vendor for downloads of media content. These and other implementations of the media request interceptor 302 are envisioned. The request for media can occur using conventional techniques. In some embodiments, the media request interceptor 302 stops the requested media from downloading until proper authorization is received. In some additional embodiments, the media request interceptor 302 intercepts the request but allows the downloading of media, which will be marked as unavailable until authorization is received. The media request interceptor 302 is arranged to communicate with the media request transmitter 304.

After the media request interceptor 302 has recognized a download request, the media request transmitter 304 creates an authorization request. The authorization request includes information about the media so that the monitoring device can determine the manner in which to handle the request. The authorization request may include any type of information including but not limited to a media identifier that identifies the media (e.g., name of a song, an artist name, an album name, a video file name), a rating for the media, an associated monitoring device responsible for authorizing media content, and/or the like. The media request transmitter 304 determines the monitoring device to which the authorization request is sent based on media settings stored on the monitored device as program data. The media settings may identify one or more different monitoring devices. The authorization transmitter may default to sending to one of the identified monitoring device, sending to a specified number of monitoring devices, or sending to all the identified monitoring devices. Changes to the media settings may be performed using the monitored media user interface 310. The media request transmitter 304 then sends the authorization request to the desired monitoring device(s) using one of the communication mechanisms provided by the monitored device. For example, the authorization request may be sent via a wireless network, such as a cellular network or wireless computer network, a wired network, and/or a combination of wireless and wired media.

The authorization receiver 306 waits for an authorization response from the monitoring device. When the authorization receiver 307 receives the authorization response, the authorization receiver may send information obtained from the authorization response to the monitored media user interface 310. If the information in the authorization response authorizes downloading the requested media, the authorization receiver 306 may also send the information to the media download initiator 308.

The media download initiator 308 communicates the media selection to the media download capability provided by the monitored device so that the media selection can be downloaded in a well-known manner from a third party media vendor. In some embodiments, the authorization receiver 306 may communicate directly with the media download capability provided by the monitored device. In these embodiments, the functionality of the media download initiator 308 may be incorporated with the functionality of the authorization receiver 306.

The monitored media user interface 310 may display a symbol on a display screen of the monitored device to alert the user on the status of the authorization request. In some additional embodiments, text may be displayed on the display screen that describes the status of the authorization request. Monitored media user interface 310 may also include password protection that prevents the monitored components from being un-installed without the password. The password may also allow a parent to review downloaded media that is marked as unauthorized and to authorize access to the downloaded media using the monitored device itself instead of via the monitoring device. This functionality may be used if the monitoring device is not readily available to review the authorization request.

Figure 4:
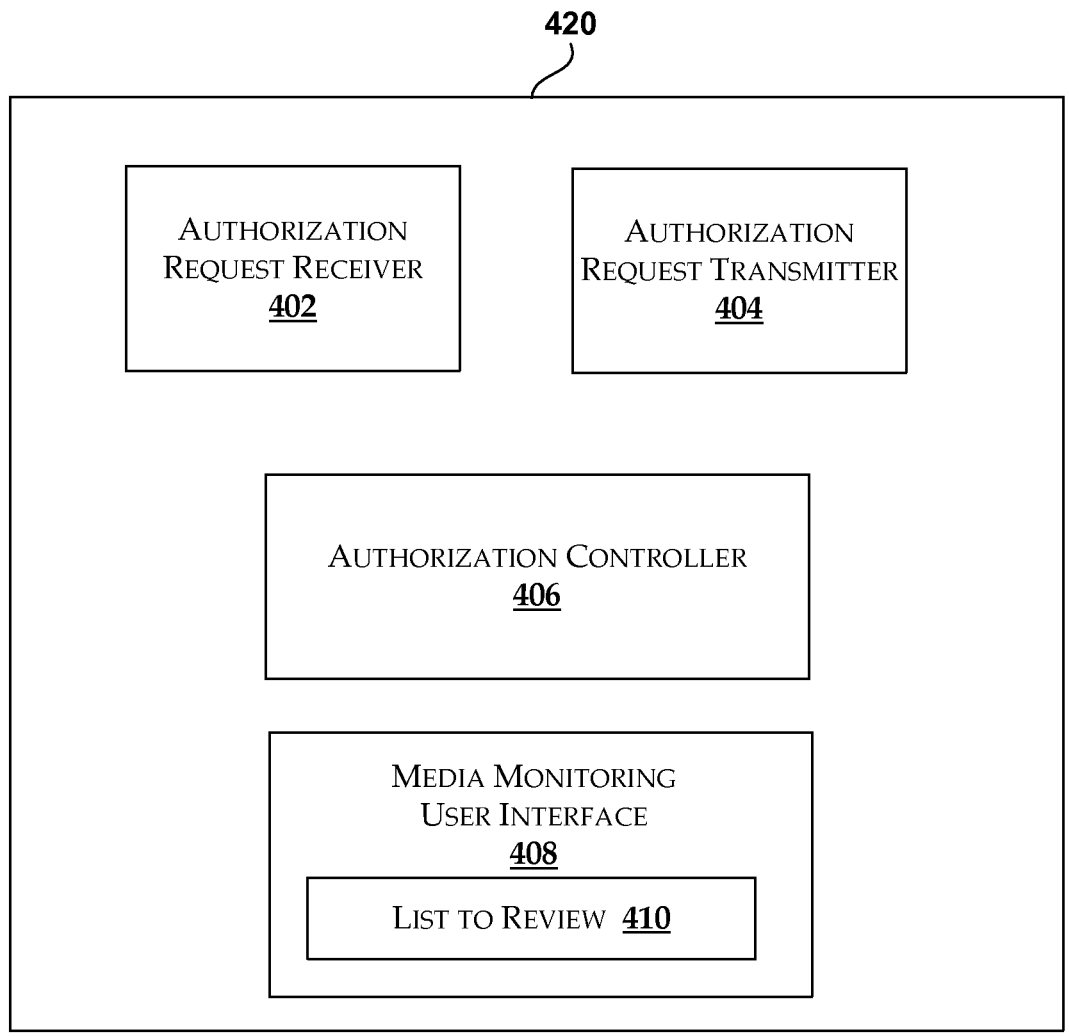
FIG. 4 is a block diagram of illustrative monitoring components that implement functionality used by the monitoring device in the media monitoring system shown in FIG. 1.

FIG. 4 is a block diagram of illustrative monitoring components that implement functionality used by the monitoring device 102 in the media monitoring system 100 shown in FIG. 1. The monitoring components used by the monitoring device include an authorization request receiver 402, an authorization request transmitter 404, a media monitoring user interface 406, and an authorization controller 408. These components may be grouped together into a media monitor 420 that can be installed on a computing device to configure the computing device as a monitoring device. In addition, one or more of these components may be installed on a computing device to configure the computing device as a media server device.

In overview, the monitoring device is configured to review media content that a corresponding monitored device wishes to download. The monitoring device 102 may obtain additional information and/or use media settings to determine whether to allow the monitored device 104 access to the requested media. The monitoring device 102 may automatically authorize or restrict access to the requested media based on media settings associated with the monitored device 104 and/or may authorize or restrict access to the requested media interactively as the authorization request is received. As those skilled in the art will recognize in light of the present disclosure, the functionality provided by one or more of the different sub-components may be provided by one or more of the other sub-components without departing from the scope of the present disclosure. The break up of the program modules into smaller sub-components is merely to aid in the description of the functionality for the monitoring device. The functionality provided by each of the sub-components is described below.

The authorization request receiver 402 recognizes an authorization request. The authorization request may be a text message, an email, a voice message, or the like. The authorization request receiver 402 may obtain the identifier for the requested media from the authorization request and forward the identifier and any other information in the authorization request onto the authorization controller 408.

The authorization controller 406 determines whether the monitored device is authorized to access the requested media. The authorization controller 406 may make this determination based on a set of media settings stored in the associated program data and/or may make this determination based on responses received via the media monitoring user interface 408. For example, if no response from the media monitoring user interface 408 is received within a pre-determined period of time, the authorization controller 406 may use the media settings (e.g., compare default rating allowed for monitored device with rating of the requested media). In addition, the authorization controller 406 may request and obtain additional information about the requested media via the media monitoring user interface 408. The authorization controller 406 communicates a decision regarding authorization of the requested media to the authorization request transmitter 404.

The authorization request transmitter 404 transmits the decision in an authorization response to the monitored device 104 via one of the communication techniques provided by the monitoring device 104. For example, the authorization response may be sent via a wireless network, such as a cellular network or wireless computer network, a wired network, and/or a combination of wireless and wired media.

The media monitoring user interface 408 displays the identifier for the requested media and optionally any additional information provided in the authorization request. In addition, the media monitoring user interface 408 may allow a user to obtain additional information about the requested media. For example, the user may browse the internet to get additional information about the media selection. The media monitoring user interface 408 may also provide a busy option that a parent may use if the parent is busy and can not review the authorization request. By selecting the busy option, the authorization response will reflect that the requested media has not been fully considered and will be reviewed at a later time. The media monitoring user interface 408 may keep a list 410 of the requested media that still need to be reviewed.

Figure 5:
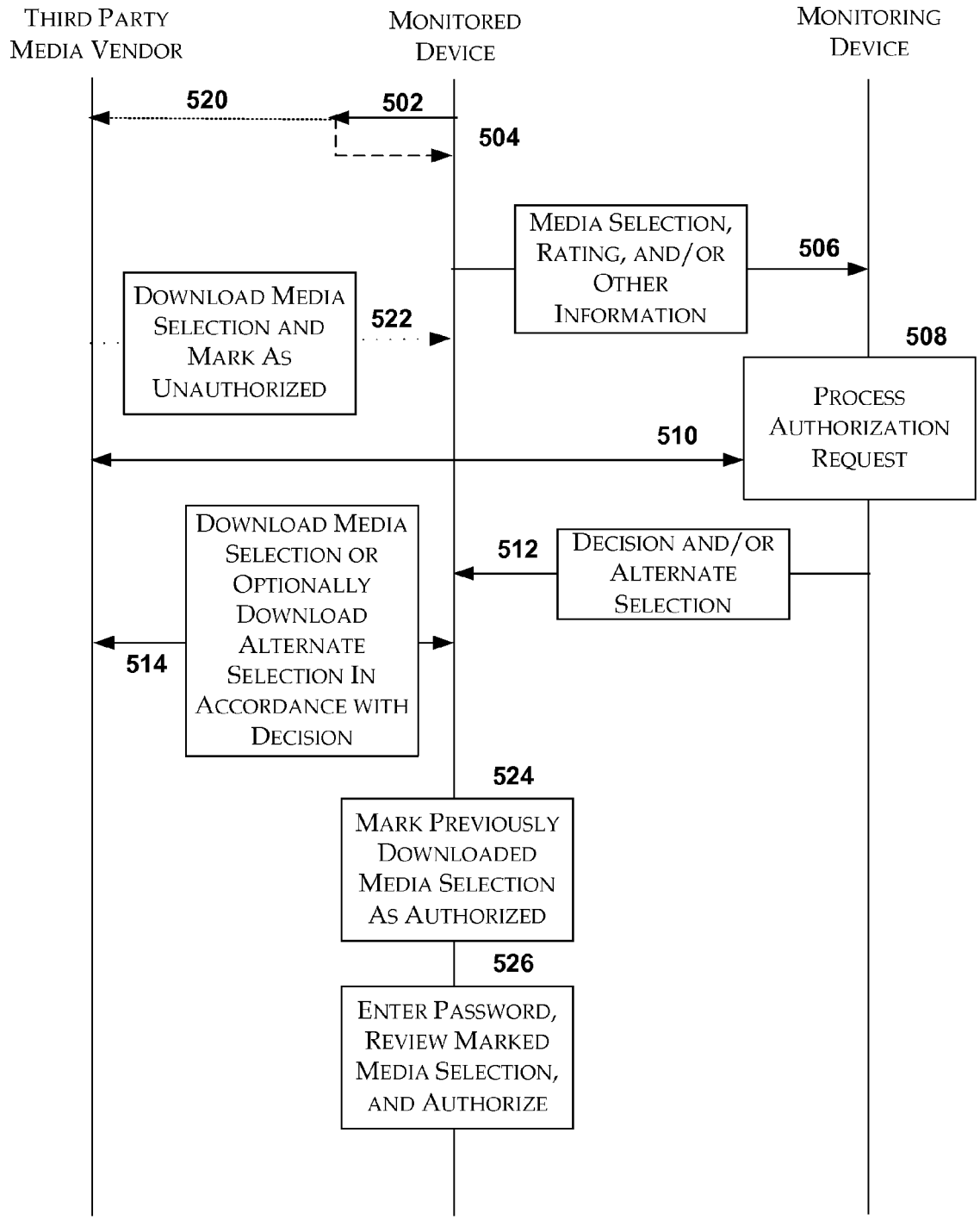
FIG. 5 is a diagram that illustrates interactions among a monitored device, a monitoring device, and a third party media vendor in the media monitoring system of FIG. 1.

FIG. 5 is a diagram that illustrates interactions among a monitored device, a monitoring device, and a third party media vendor in the media monitoring system of FIG. 1. In FIG. 5, and in the following figures that include various illustrative embodiments of operational flows, discussion and explanation may be provided with respect to apparatus and methods described herein, and/or with respect to other examples and contexts. The operational flows may also be executed in a variety of other contexts and environments, and or in modified versions of those described herein. In addition, although some of the operational flows are presented in sequence, the various operations may be performed in various repetitions, concurrently, and/or in other orders than those that are illustrated. The processes described herein may be implemented using computer-executable instructions in software or firmware, but may also be implemented in other ways, such as with programmable logic, electronic circuitry, or the like. In some alternative embodiments, certain of the operations may even be performed with limited human intervention. Moreover, the process is not to be interpreted as exclusive of other embodiments, but rather is provided as illustrative only.

The diagram in FIG. 5 illustrates communication from the monitored device in the center, the third party media vendor on the left and the monitoring device on the right. An example communication sequence begins at sequence 502 where the monitored device initiates a request for a media selection from a third party media vendor. At sequence 504, the monitored device intercepts that request. Sequence 506 illustrates the monitored device transmitting an authorization request. The authorization request may include an indicator for the media selection, a rating, and/or other information about the media selection. In some embodiment, the authorization request may include the media selection so that the monitoring device does not need to locate the media selection and download it. For example, if the monitored device received a text message with media content (e.g., a video file), the media content may be sent in the authorization request because the media content may not be available by other third party sources. As described above, the monitored device may transmit the authorization request before, during, or after (see sequence 520) the media is requested to download. At sequence 508, the monitoring device processes the authorization request. Processing may include gathering additional information to determine whether or not to authorize the download. For example, at sequence 510 the monitoring device may send a request to a third party media vendor to download the media selection for review. The monitoring device may also obtain other information about the media selection, such as lyrics, reviews, ratings, and the like from the internet. The monitoring device may use one or more rating systems, such as the Motion Picture Association of America (MPAA) and/or the Recording Industry Association of America (RIAA) rating systems, to determine whether to authorize the download. In addition, the monitoring device may perform lyric and/or video frame analysis to determine whether to authorize the download. Sequence 508 may also include processing the authorization request using default settings.

At sequence 512, the monitoring device transmits an authorization response to the monitored device that includes a decision. The authorization response may also include an alternate selection if the requested did not meet the criteria for downloadability by the monitored device. The alternate selection may be a version of the requested media selection that passes the criteria and that can be downloaded by the monitored device.

At sequence 514, the monitored device acts in accordance with the decision received from the monitoring device in the authorization response. If the decision does not authorize the download of the media selection, the monitored device will not be able to access the media selection. If the decision does authorize the download of the media selection, the monitored device may download the media selection from the third party media vendor. If the decision provides an alternate media selection to download, the monitored device may optionally download the alternate media selection from the third party media vendor. Because the alternate version may not be of interest to the end user requesting the selected media, the monitored device provides an option to the end user for declining the alternate selection before proceeding with the download and payment.

At sequence 522, the media selection is downloaded from the third party media vendor before a decision is returned from the monitoring device. Thus, after the media is downloaded, the monitored device marks the downloaded media in a manner such that it is inaccessible to a user. This allows the media content to become quickly available once the authorization response is received and the media content is authorized for download. In that embodiment, at sequence 524, the monitored device changes the mark on the downloaded media selection to make it accessible. If the downloaded media content is marked as unauthorized, at sequence 526, a parent may enter a password on the monitored device, listen to the downloaded media selection, and determine whether to allow the monitored device access to the media selection.

One will note that FIG. 5 does not include communication with a server device. However, one skilled in the art having read the present disclosure will appreciate that the server device may interact with the monitoring device to provide default settings for the monitored device. Because the server device is typically configured with more storage space than the monitoring device, the server device can off load some of the storage that is needed. In addition, the server device may be configured to handle multiple interactions between multiple monitoring devices and monitored devices.

FIG. 6 is a diagram generally illustrating a computer product 600 configured to perform processing by the monitored device in the media monitoring system shown in FIG. 1. The computer program product 600 may be one of several forms, such as a computer storage media having computer-executable instructions 602, a recordable medium 604, a computer-implemented method 606, or the like. When the computer-executable instructions are executed, a method is performed. The method includes at least two of the following. Receiving 610 an authorization request that originated from an associated device. Obtaining 612 a media selection from the authorization request. Making 614 a decision whether to allow the associated device access to the media selection. Sending 616 the decision to the associated device.

FIG. 7 is a diagram generally illustrating a computer product 700 configured to perform processing by the monitoring device in the media monitoring system shown in FIG. 1. The computer program product 700 may be one of several forms, such as a computer storage media having computer-executable instructions 702, a recordable medium 704, a computer-implemented method 706, or the like. When the computer-executable instructions are executed, a method is performed. The method includes at least two of the following. Sending 710 an authorization request to an associated device, the authorization request including a media selection. Receiving 712 an authorization response from the associated device, the authorization response including a decision on whether the media selection can be downloaded. Acting 714 in accordance with the decision with respect to the media selection.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various embodiments have been disclosed herein, other aspects and embodiments will be apparent to those skilled in art. The various embodiments disclosed herein are for purposes of illustration and are not intended to be limiting, with the true scope and spirit being indicated by the following claims.

What is claimed is:

1. A system effective to control access to media, the system comprising:
    a monitored device;
    a monitoring device different from and configured to be in communication with the monitored device;
    wherein the monitored device is effective to
        generate a request to access media on the monitored device;
        send the request to a third party media vendor processor different from the monitored device and the monitoring device;
    make the media inaccessible on the monitored device;
        send an authorization request to access the media from the monitored device to the monitoring device;
    wherein the monitoring device is effective to
        receive the authorization request;
        generate a decision as to whether to allow access to the media by the monitored device;
        generate an authorization response based on the decision;
        send the authorization response to the monitored device;
    the monitored device further effective to
        receive the authorization response from the monitoring device; and
        in response to the authorization response, make the media accessible on the monitored device;
    wherein to generate the decision as to whether to allow access to the media by the monitored device, the monitoring device is effective to:
        determine whether a response to the authorization request is received at a user interface within a threshold amount of time; and
        generate the decision by a comparison of a rating for the media with a default rating setting in response to a determination that no response is received within the threshold amount of time, wherein the default rating setting specifies which rating levels are allowed on the monitored device.

2. The system of claim 1, wherein the monitoring device is further effective to generate the decision by review of the media.

3. The system of claim 1, wherein the monitoring device is further effective to make the decision by review of lyrics of the media.

4. The system of claim 1, wherein the monitoring device is further effective to make the decision by review of video of the media.

5. The system of claim 1, wherein the monitoring device is further effective to make the decision by review of a picture from the media.

6. The system of claim 1, wherein the monitoring device is effective to send the authorization response to the monitored device through a cellular network.

7. The system of claim 1, wherein the monitoring device is effective to send the authorization response to the monitored device through a wireless network.

8. The system of claim 1, wherein the monitoring device is further effective to send an alternative media selection with the authorization response, wherein the alternative media selection includes another version of the media.

9. The system claim 1, wherein the monitoring device is effective to download the media from the media processor in response to the authorization response.

10. The system of claim 1 wherein prior to receipt of the authorization response, the monitored device is effective to download the media from the media processor and mark the media as unauthorized so that the media is not accessible to the monitored device.

11. The system of claim 1 wherein:
prior to receipt of the authorization response, the monitored device is effective to download the media from the media processor and mark the media as unauthorized; and
after receipt of the authorization response, the monitored device is effective to mark
the media as authorized.

12. The system of claim 1, wherein if the authorization response indicates that the monitoring device has not reviewed the authorization request, the monitored device is further is effective to allow entry of a password to authorize access to the media.

13. The system of claim 1, wherein the authorization response is a first authorization response, and wherein the monitoring device is further effective to:
generate a second authorization response prior to the first authorization response, wherein the second authorization response is generated at a first time;
send the second authorization response to the monitored device, wherein the second authorization response includes a busy response, and wherein the busy response indicates that the monitoring device will review the authorization request and generate the decision at a second time, wherein the second time in later than the first time.

14. A method for controlling access to media, the method comprising, by a monitored device:
generating a request to access media on the monitored device;
sending the request to a third party media vendor processor different from the monitored device;
make the media inaccessible on the monitored device;
sending an authorization request to access the media from the monitored device to
a monitoring device different from the monitored device and the third party media vendor processor;
receiving an authorization response from the monitoring device, wherein the authorization response includes a decision as to whether to allow access to the media by the monitored device, and wherein the decision is generated by a comparison of a rating for the media with a default rating setting in response to a determination that no response is received at a user interface of the monitoring device within a threshold amount of time, wherein the default rating setting specifies which rating levels are allowed on the monitored device; and
in response to the authorization response, making the media accessible on the monitored device.

15. The method of claim 14, wherein the sending the authorization request includes sending the rating for the media.

16. The method claim 14, further comprising downloading the media from the media processor in response to the authorization response.

17. The method of claim 14, further comprising, prior to receipt of the authorization response:
downloading the media from the media processor; and
marking the media as unauthorized so that the media is not accessible to the monitored device.

18. The method of claim 14, further comprising prior to receipt of the authorization response:
downloading the media from the media processor; and
marking the media as authorized so that the media is accessible to the monitored device.

19. A monitored device effective to control access to media, the monitored device comprising:
a memory;
a processor in communication with the memory, the processor effective to:
generate a request to access media on a monitored device;
send the request to a third party media vendor processor different from the monitored device;
make the media inaccessible on the monitored device;
send an authorization request to access the media from the monitored device to a monitoring device, different from the monitored device and the third party media vendor processor;
receive an authorization response from the monitoring device, wherein the authorization response includes a decision as to whether to allow access to the media by the monitored device, and wherein the decision is generated by a comparison of a rating for the media with a default rating setting in response to a determination that no response is received at a user interface of the monitoring device within a threshold amount of time, wherein the default rating setting specifies which rating levels are allowed on the monitored device; and
in response to the authorization response, make the media accessible on the monitored device.

20. The monitored device of claim 19, wherein the authorization request includes the rating for the media.

21. The monitored device claim 19, wherein the processor is further effective to download the media from the media processor in response to the authorization response.

22. The monitored device of claim 19, wherein the processor is further effective to, prior to receipt of the authorization response:
download the media from the media processor; and
mark the media as unauthorized so that the media is not accessible to the monitored device.

23. The monitored device of claim 19, wherein the processor is further effective to, prior to receipt of the authorization response:
download the media from the media processor; and
mark the media as authorized so that the media is accessible to the monitored device.

* * * * *

UNITED STATES PATENT AND TRADEMARK OFFICE
CERTIFICATE OF CORRECTION

| | | |
|---|---|---|
| PATENT NO. | : 8,893,232 B2 | Page 1 of 1 |
| APPLICATION NO. | : 12/367237 | |
| DATED | : November 18, 2014 | |
| INVENTOR(S) | : Fein et al. | |

It is certified that error appears in the above-identified patent and that said Letters Patent is hereby corrected as shown below:

In the Claims

In Column 13, Line 1, in Claim 9, delete "system claim" and insert -- system of claim --, therefor.

In Column 13, Line 16, in Claim 11, delete "the media as authorized." and insert the same at Line 15, after "mark", as a continuation sub-point.

In Column 13, Line 20, in Claim 12, delete "further is" and insert -- further --, therefor.

In Column 14, Line 1, in Claim 16, delete "method claim" and insert -- method of claim --, therefor.

In Column 14, Line 43, in Claim 21, delete "device claim" and insert -- device of claim --, therefor.

Signed and Sealed this
Nineteenth Day of May, 2015

Michelle K. Lee
*Director of the United States Patent and Trademark Office*